INVENTOR.
JULIUS B. LAGSDIN

ATTORNEY

United States Patent Office 3,188,261
Patented June 8, 1965

3,188,261
LABELLING DEVICE
Julius Bernard Lagsdin, Pearl River, N.Y., assignor to American Cyanamid Company, New York, N.Y., a corporation of Maine
Filed Jan. 5, 1962, Ser. No. 164,510
3 Claims. (Cl. 156—493)

This application is a continuation-in-part of my copending application Serial No. 9,341, filed February 17, 1960, now abandoned.

This invention relates to a labelling device for labelling filled, collapsible-type tubes.

Many articles in paste or liquid form are marketed in collapsible tubes. These tubes when filled are not perfect cylinders as the filling end is customarily crimped over to seal the bottom of the tube, delivery of the material being from the other end of the tube which is usually provided with a screw cap. The tubes are readily deformable. In fact, this is the main reason why they are used because as their contents are gradually used up the tube may be deformed to force out further portions with its contents, and the soft flexible nature of the tube walls, which may be soft metal alloys, plastics and the like are designed to permit ready deformation.

This necessary characteristic of the filled tubes makes labelling them an extremely serious problem. Where enormous number of tubes containing the same material are to be produced, for example, tubes contining toothpaste, it is economically feasible to print the tube blanks with a suitable coating composition and so the labelling of such tubes, when filled, is not a problem because they are already labelled before they are filled. However, there are many uses, for example, in pharmaceutical work where the printing of the tube blanks is not feasible or is not sufficient. For example, if the number of tubes is not very large for any one product at any one time preprinting of the blanks becomes uneconomical. An even more important difficulty is encountered where, as with many pharmaceutical products, it is necessary to give information as to particular batches, in fact sometimes this is required by law. As a result it becomes necessary to use labels. Hitherto when labels were used they had to be affixed by hand and this constituted a serious additional cost. However, ordinary labelling machines are designed to handle perfect cylinders or containers which are not readily deformed, and such machinery cannot be employed with filled, deformable, collapsible-type tubes.

The problem is solved by the present invention in a device in which the filled tubes are automatically labelled, the label being affixed by contact with yielding surfaces, one of them being a moving belt with a soft yielding surface attached to it and the other a flat stationary surface with a soft yielding surface such as sponge rubber or polyurethane foam. The yielding surfaces must be of sufficient thickness so that they will accommodate themselves to the maximum dimension of the tubes. In the case of rounded tubes this is the largest part of the tube and in the case of square tubes or similar polygonal tubes the maximum dimension will be the distance between edges. In this way the pressure which affixes the label is uniformly distributed over the periphery of the tube and no deformation takes place. At the same time the device is automatic and fast.

The device and its operation will be described in greater detail in conjunction with the drawings in which.

Figure 1:
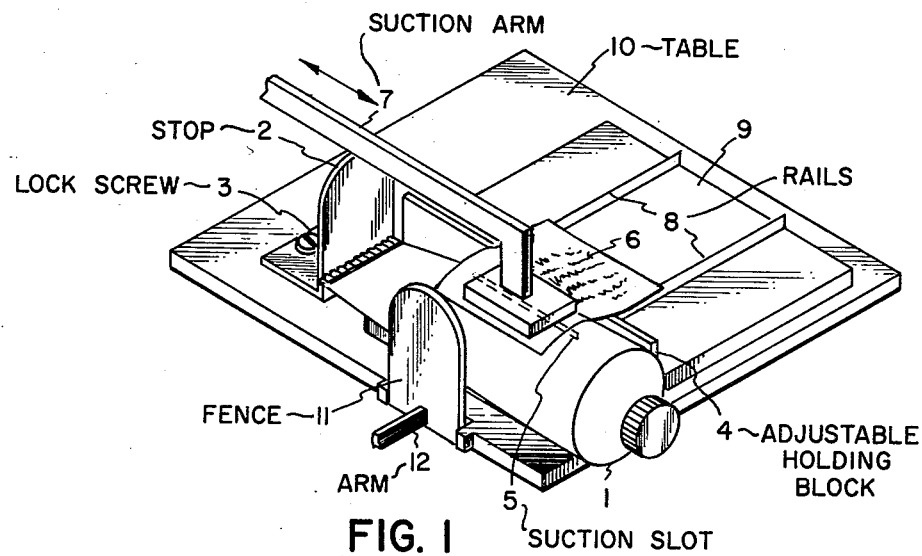
FIGURE 1 is an isometric view of the tube feeding end of the machine at the start of labelling.

In FIGURE 1 a tube is shown placed by hand at 1. It is inserted against the stop 2 which can be adjusted for different tube lengths and is held in position by a locking screw 3. Since the tube is not cylindrical and may taper, it is held against an adjustable wedge shaped holding block 4. This block is provided with a short suction slot 5, which holds the tube against it and assures proper alignment. Labels 6 are picked up by the suction arm 7 which is of conventional design. It is shown as moveable in the directions of the double arrow. Rails with sharp edges 8 are provided on which the rear wet portion of the gummed label rests when first applied. The rails are carried on a raised portion 9, which is fastened to a main table 10, on which the stops 2 and 4 are also attached.

In operation with the fence 11 up, the tube is placed by hand against the stop 2, and is drawn against the wedge shaped block 4 by suction. As the machine operates the arm 7 picks up the label and attaches it, or rather its leading edge, firmly on the tube. FIGURE 1 shows the machine at this instant. The actuation of the label arm on movement of the rods 12 and the table 10 as will be described later, are all from a conventional labelling machine drive. Since the present invention does not change this standard form of drive, it is not shown.

As soon as the leading edge of the label has been attached, the vacuum is broken in the arm 7, as is conventional in labelling machines. The arm rises and is retracted in position to pick up a new label from the label stack which is in the same form as in any ordinary labelling machine and is therefore not shown.

Figure 2:
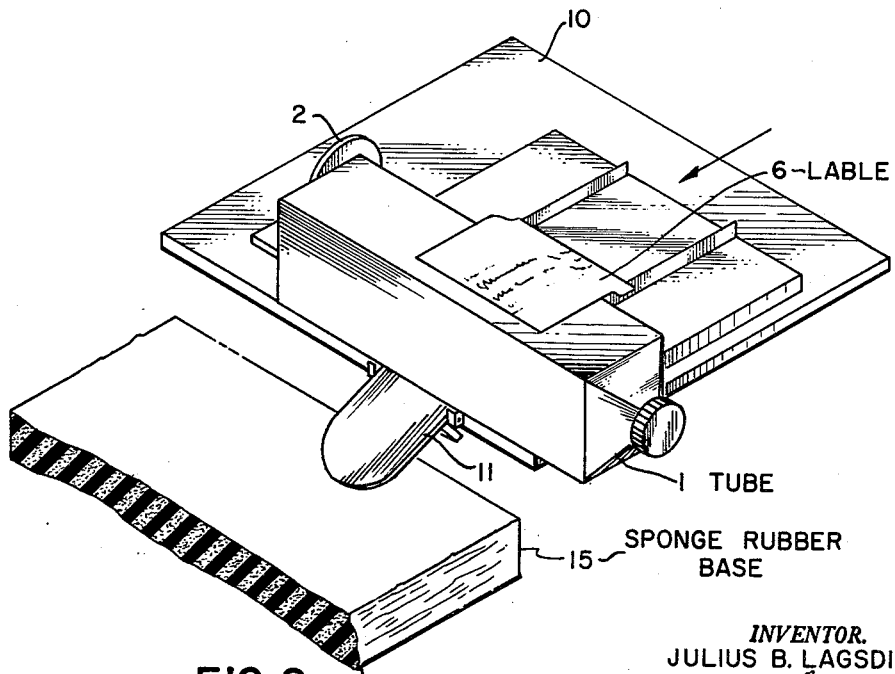
FIGURE 2 is a similar view after the leading edge of the label has been affixed.
Figure 3:
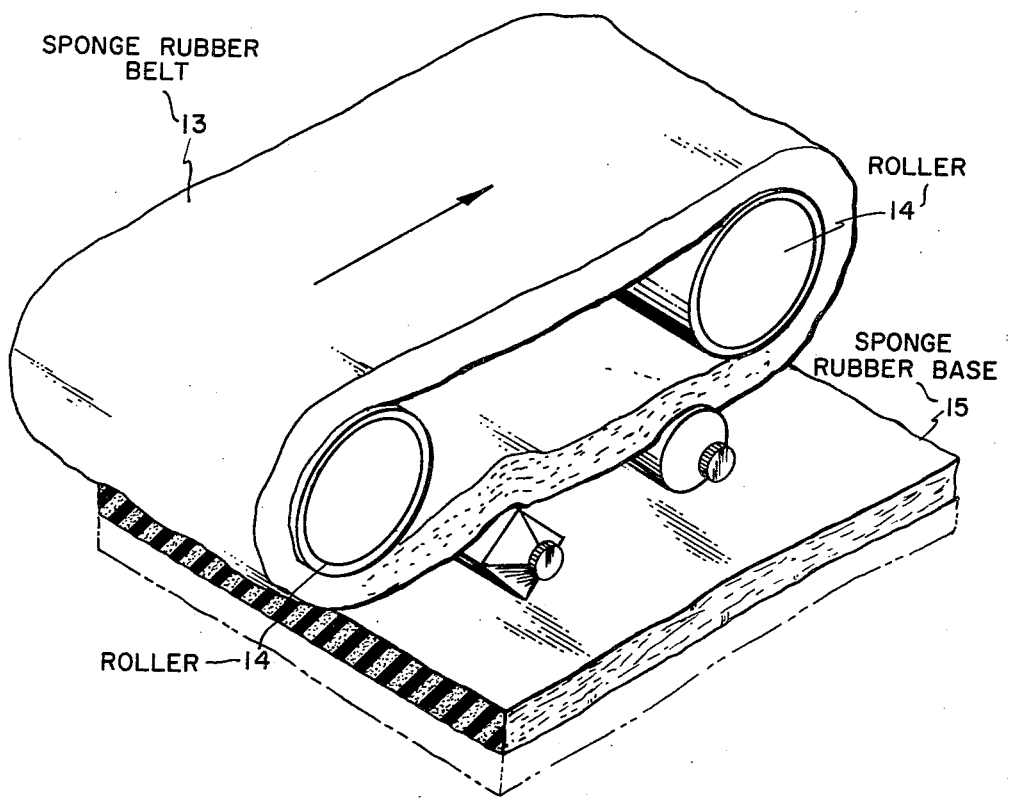
FIGURE 3 is an isometric view of the labelling belt and discharge means.

The machine drive now produces two motions in sequence. First the arm 12 is moved so that the fence 11 is hinged down to the position in which it is shown in FIGURE 2. Then the table 10 begins to move forward in the direction shown in the arrow. In order to illustrate the utility of the machine for tubes of various shape a tapering rounded tube is shown in FIGURE 1, and a square tube in FIGURE 2 and the adjustable wedge shaped holding block is removable to accommodate square tubes as shown in FIGURE 2. The table 10 moves forward and causes the edge of the tube to encounter a belt 13 of thick sponge rubber which turns over two rollers 14. This is shown in FIGURE 3. The belt causes the tube to turn and roll down the retracted fence 11 onto a sponge rubber base 15. The label wraps itself around the tube as it turns. There is no significant adhesion of the label to the edges of the rails 8 which may preferably be provided with a surface of polytetrafluoroethylene or similar material having low adhering properties. The movement of the belt 13 causes the tubes to turn and roll along the sponge rubber base 15. This results in an even, gentle, but nevertheless firm pressure on the label so that it is firmly attached to the tube. When the tube reaches the end of the belt, it is dropped into a conventional discharge chute which is not shown.

FIGURE 3 shows both a square tube and a rounded tube moving between the belt and the base 15. It will be noted that in the case of the square tube the greatest dimension is from one edge to another and the belt and the sponge rubber base must provide sufficient thickness so that they can accommodate themselves to this dimension without deforming the tube. The machine operates entirely automatically except that the tubes must be fed by hand. However, since the stops 2 and 4 with the suction slot on the latter assure that the tube aligns itself up properly and immediately a very rapid operation is possible. For example, tubes can be fed at the rate of approximately fifty a minute.

While the dimensions of the various elements, and particularly the belt and soft base 15 will vary with the tubes which are to be labelled, it is in general desirable that the mat 15 be at least a half inch thick so that in the case of rounded tubes the crimped bottom edge cannot be deformed. Very large tubes may require somewhat greater thickness. The belt and mat 15 may be of sponge rubber or any other foamed elastomer. On the other hand, the rest of the machine may be of any suitable material such as wood, metal, ceramic, plastic and the like, and as has been stated above, can cooperate with standard labelling machine drives.

I claim:

1. A labelling device for filled collapsible tubes which are non-cylindrical comprising in combination means for maintaining a filled tube in a predetermined position, said means including a shaped block adapted for holding and supporting said tube, said block having a surface adapted to approximate the shape of the tube, a slot in the block and means for holding the tube thereagainst by vacuum, means for applying an adhesive edge of a label to the upper surface of the tube, tube rolling means comprising a moving resilient belt and a resilient base, said belt and base having yielding surfaces of sufficient thickness and yieldability so as to adapt themselves to the eccentricities of the non-cylindrical perimeter of the tube as it rolls, said belt being of sufficient length so as to rotate the tube through at least the full length of the label, and means for delivering the tube into contact with said belt whereby the tube is rolled by the belt between it and the resilient base and is moved forward.

2. A labelling device for filled collapsible tubes which are non-cylindrical comprising in combination means for maintaining a filled tube in a predetermined position, means for applying an adhesive edge of a label to the upper surface of the tube, tube rolling means comprising a moving resilient belt and a resilient base, said belt and base having yielding surfaces of sufficient thickness and yieldability so as to adapt themselves to the eccentricities of the non-cylindrical perimeter of the tube as it rolls, said belt being of sufficient length so as to rotate the tube through at least the full length of the label, and means for delivering the tube into contact with said belt whereby the tube is rolled by the belt between it and the resilient base and is moved forward.

3. A device according to claim 2 including a reciprocating arm, a hinged plate thereon adapted in its upright position to engage the filled tube and to press it against the holding block and on its reverse reciprocation to fold down the plate about its hinge to constitute a ramp down which a filled tube can roll into contact with the rotating belt, the reciproctaion of the arm, application of holding vacuum to the slot in the face of the holding block and label attaching means being in synchronism to hold the tube during the affixing of a label edge thereto.

References Cited by the Examiner
UNITED STATES PATENTS

| | | | |
|---|---|---|---|
| 2,166,497 | 9/39 | Knoedler et al. | 156—488 |
| 2,303,525 | 12/42 | Craig et al. | 156—493 |
| 2,525,504 | 10/50 | Von Hofe et al. | 156—566 |

EARL M. BERGERT, *Primary Examiner.*